(12) United States Patent
Lv et al.

(10) Patent No.: US 9,389,358 B2
(45) Date of Patent: Jul. 12, 2016

(54) BACKLIGHT MODULE AND LCD MODULE

(71) Applicant: SHENZHEN CHINA STAR OPTOELECTRONICS TECHNOLOGY CO., LTD., Shenzhen, Guangdong (CN)

(72) Inventors: Chengling Lv, Guangdong (CN); Yi Cheng Kuo, Guangdong (CN); Yuchun Hsiao, Guangdong (CN)

(*) Notice: Subject to any disclaimer, the term of this patent is extended or adjusted under 35 U.S.C. 154(b) by 0 days.

(21) Appl. No.: 14/008,536
(22) PCT Filed: Jun. 29, 2013
(86) PCT No.: PCT/CN2013/078526
§ 371 (c)(1),
(2) Date: Sep. 27, 2013
(87) PCT Pub. No.: WO2014/194543
PCT Pub. Date: Dec. 11, 2014

(65) Prior Publication Data
US 2016/0077275 A1 Mar. 17, 2016

(30) Foreign Application Priority Data
Jun. 7, 2013 (CN) .......................... 2013 1 0226234

(51) Int. Cl.
*F21V 8/00* (2006.01)
*G02F 1/1333* (2006.01)

(52) U.S. Cl.
CPC .............. *G02B 6/0088* (2013.01); *G02B 6/009* (2013.01); *G02F 1/133308* (2013.01); *G02F 2001/13332* (2013.01); *G02F 2001/133314* (2013.01)

(58) Field of Classification Search
CPC ............... G02F 1/133308; G02F 1/133603; G02F 1/133615; G02F 1/133608; G02F 1/133605; G02F 1/157; G02F 1/1333; G02F 1/1336; G02F 1/133602; G02F 1/133604; G02F 1/133606; G02F 1/133611; G02F 1/0072; G02F 1/0147; G02F 1/1335; G02F 1/133504; G02F 1/133524; G02F 1/133553; G02F 2001/133314; G02F 2001/133317; G02F 2001/13332; G02F 2001/133322; G02F 2001/133331; G02F 2001/133311; G02F 2001/133328; G02F 2201/46; G02F 2201/465; G02F 2201/50; G02F 2201/54; G02F 2201/503; G02F 2202/28; G02F 2413/07; G02B 6/0031; G02B 6/0055; G02B 6/0086; G02B 6/0081; G02B 6/0051; H04N 5/64; H04N 5/645; H04N 5/655; H04N 5/2252; G06F 1/16; G06F 1/1601; F21V 21/00; F21V 17/08
USPC ............... 349/65, 58, 61, 96, 67, 62, 64, 122; 362/611, 97.1, 612, 609, 97.2, 97.3, 362/97.4, 296.01, 217.1, 240, 249.01, 362, 362/632, 633, 634; 348/794, 836, E5.128
See application file for complete search history.

(56) References Cited

U.S. PATENT DOCUMENTS

2009/0295741 A1 12/2009 Cheng
2013/0321293 A1* 12/2013 Park .................... G06F 3/041
 345/173

FOREIGN PATENT DOCUMENTS

CN 1556432 A 12/2004
CN 1959484 A 5/2007
(Continued)

OTHER PUBLICATIONS

CUI ShuangKui, the International Searching Authority written comments, Mar. 2014, CN.

*Primary Examiner* — Thoi Duong

(57) ABSTRACT

The present invention discloses a backlight module and LCD module, the backlight module comprises a back cover, a positioning assembly and a backlight assembly, wherein the backlight assembly is connected with the back cover by the positioning assembly, the positioning assembly comprises a positioning component located at the corner of the back cover and a bending portion provided on the back cover. By means of the bending portion on the back cover, the light guide plate and optical films can be fixed easily and expediently, especially for the assembling and reworking of module. In addition, the other parts disposed close to the light guide plate, for example LED, can be protected effectively from being crushed because of the expansion of light guide plate.

10 Claims, 4 Drawing Sheets

(56) References Cited

FOREIGN PATENT DOCUMENTS

| | | |
|---|---|---|
| CN | 1959493 A | 5/2007 |
| CN | 101660724 A | 3/2010 |
| CN | 101988995 A | 3/2011 |
| CN | 102032512 A | 4/2011 |
| CN | 102798035 A | 11/2012 |
| CN | 102889527 A | 1/2013 |
| JP | 2002156632 A | 5/2002 |
| KR | 20080021987 A | 3/2006 |

* cited by examiner

BACKLIGHT MODULE AND LCD MODULE

TECHNICAL FIELD OF THE INVENTION

The present invention relates to the manufacturing technology of liquid crystal displays, and more particularly to a backlight module and LCD module.

BACKGROUND OF THE INVENTION

The statements in this section merely provide background information related to the present invention and may or may not constitute prior art.

LCD (liquid crystal display) TV, PC, Monitors, display devices are widely used. In general, a LCD module comprises three main assemblies, i.e. a backlight module, a LCD panel and a front frame. The backlight module comprises a back cover, a positioning assembly and a backlight assembly. The backlight assembly may comprise reflecting sheet, a light guiding plate and optical membranes. The reflecting sheet, the light guiding plate and the optical membranes (optical films) are fixed by four positioning components located at the four corner of the back cover respectively. As shown in FIG. 1, the end portions of the positioning components 104 are provided with a hook 101. By means of the hook 101 the positioning components 104 is connected to the back cover 108. Furthermore, the light guiding plate 106 is positioned by the stepping portions of the positioning components 104. And the positioning components 104 are provided with pins 105 and the optical membranes 103 are provided with holes. The pins 105 penetrate through the holes on the optical membranes 103 so as to guarantee the mechanical strength of the optical membranes 103. In this way, the optical membranes 103 are fixed on by the positioning components 104 securely. Since the light guiding plate 106 may expand when it is heated, the positioning components 104 is usually formed of elastic material such as rubber. However, the light guiding plate 106 may expand and exert pressure on other parts (such as the light bar of the backlight module). There is a risk that the other parts will be compressed and damaged by the light guiding plate.

SUMMARY OF THE INVENTION

The present invention provides a backlight module to solve the mentioned problem above.

The present invention is realized in such a way that: a backlight module, which comprises a back cover, a positioning assembly and a backlight assembly, wherein the backlight assembly is connected with the back cover by the positioning assembly, the positioning assembly comprises a positioning component located at the corner of the back cover and a bending portion provided on the back cover, the positioning component is adhered onto the back cover.

According to an embodiment disclosed herein, the bending portion is formed on the side wall of the back cover in an integral manner and extends inwards.

According to another embodiment disclosed herein, the bending portion comprises a first bending section extending inwards and a second bending section extending upwards from the first bending section, the second bending section penetrates through the positioning component.

According to another embodiment disclosed herein, the backlight assembly comprises a reflecting sheet, a light guiding plate and optical membranes, the reflecting sheet, the light guiding plate and the optical membranes are overlapped on the positioning component.

According to another embodiment disclosed herein, the optical membranes are provided with through holes, the second bending section penetrates through the through holes.

According to another embodiment disclosed herein, the positioning assembly further comprises an additional bending portion, the additional bending portion is formed on the side wall of the back cover in an integral manner, the additional bending portion extends inwards and then upwards, the additional bending portion is located at the same side with the light source of the backlight module, so as to prevent the light source from being pressed by the expansion of light guide plate.

According to another embodiment disclosed herein, the additional bending portion and the bending portion are located at the different sides of the back cover; the additional bending portion and the bending portion have the same shape.

According to another aspect of the present invention, a LCD module is also provided, which comprises a backlight module, a LCD panel and a front frame, the backlight module is connected with the front frame, the backlight module comprises a back cover, a positioning assembly and a backlight assembly, wherein the backlight assembly is connected with the back cover by the positioning assembly, the positioning assembly comprises a positioning component located at the corner of the back cover and a bending portion provided on the back cover, the positioning component is adhered onto the back cover.

According to another embodiment disclosed herein, the LCD module further comprises a plastic frame between the backlight module and the front frame, the LCD panel is received between the front frame and the plastic frame.

According to another embodiment disclosed herein, the bending portion is formed on the side wall of the back cover in an integral manner and extends inwards.

According to another embodiment disclosed herein, the bending portion comprises a first bending section extending inwards and a second bending section extending upwards from the first bending section, the second bending section penetrates through the positioning component.

According to another embodiment disclosed herein, the backlight assembly comprises a reflecting sheet, a light guiding plate and optical membranes, the reflecting sheet, the light guiding plate and optical membranes are overlapped on the positioning component.

According to another embodiment disclosed herein, the optical membranes are provided with through holes, the second bending section penetrates through the through holes.

According to yet another embodiment disclosed herein, the positioning assembly further comprises an additional bending portion, the additional bending portion is formed on the side wall of the back cover in an integral manner, the additional bending portion extends inwards and then upwards, the additional bending portion is located at the same side with the light source of the LCD module, so as to prevent the light source from being pressed by the expansion of light guide plate.

According to another embodiment disclosed herein, the additional bending portion and the bending portion are located at the different sides of the back cover; the additional bending portion and the bending portion have the same shape.

According to the present invention, a backlight module comprises a back cover, a positioning assembly and a backlight assembly, wherein the backlight assembly is connected with the back cover by the positioning assembly, the positioning assembly comprises a positioning component located at the corner of the back cover and a bending portion provided on the back cover, the positioning component is adhered onto the back cover. By means of the bending portion on the back cover, the light guide plate and optical films can be fixed easily and expediently, especially for the assembling and reworking of module. In addition, the other parts disposed close to the light guide plate, for example LED, can be protected effectively from being crushed because of the expansion of light guide plate.

For more clearly and easily understanding above content of the present invention, the following text will take a preferred embodiment of the present invention with reference to the accompanying drawings for detail description as follows.

BRIEF DESCRIPTION OF THE DRAWINGS

The drawings described herein are for illustration purposes only and are not intended to limit the scope of the present disclosure in any way.

DETAILED DESCRIPTION OF PREFERRED EMBODIMENTS

The following detailed description of every embodiment with reference to the accompanying drawings is used to exemplify a specific embodiment, which may be carried out in the present invention. Directional terms mentioned in the present invention, such as "upwards", "inwards", "front", "rear", "left", "right", "up", "down", "inside", "outside", "side" etc., are only used with reference to the orientation of the accompanying drawings. Therefore, the used directional terms are intended to illustrate, but not to limit, the present invention. Also the following description is merely exemplary in nature and is not intended to limit the present disclosure, application, or uses.

Figure 2:
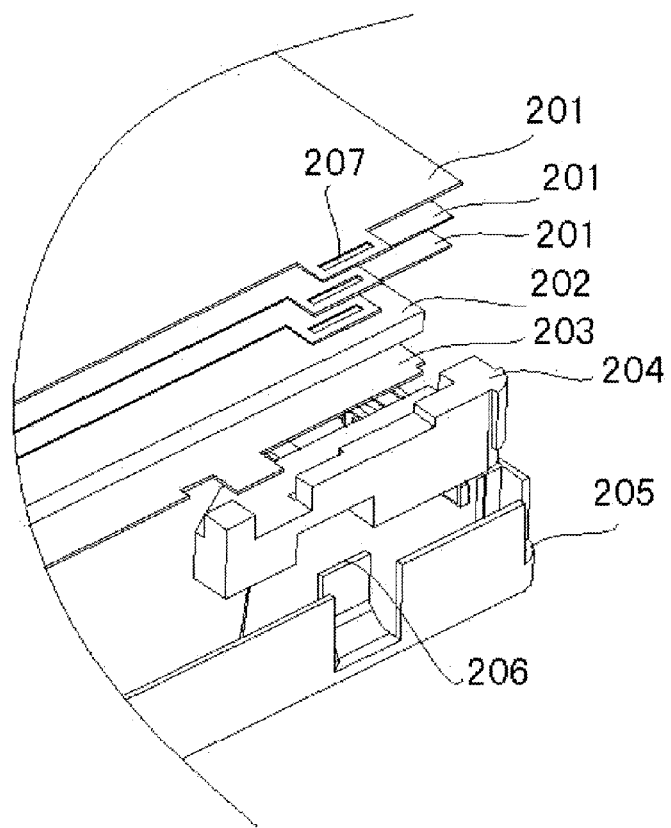
FIG. 2 is a schematic exploded view of the backlight module according to an embodiment of the present invention.
Figure 3:
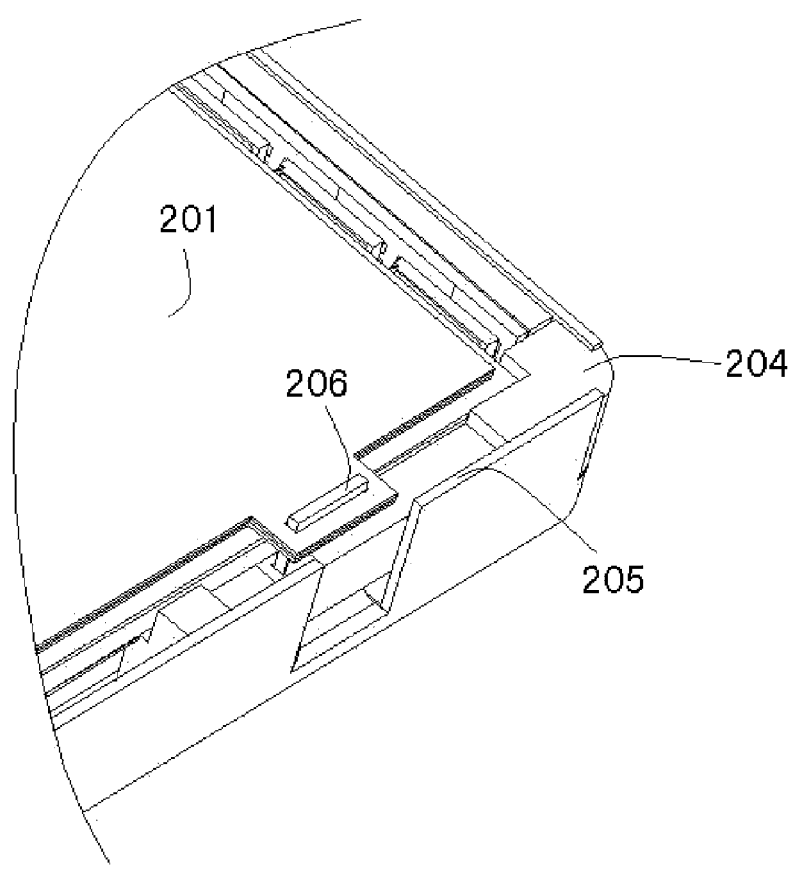
FIG. 3 is a schematic view of the backlight module of FIG. 2 in assembled state.
Figure 4:
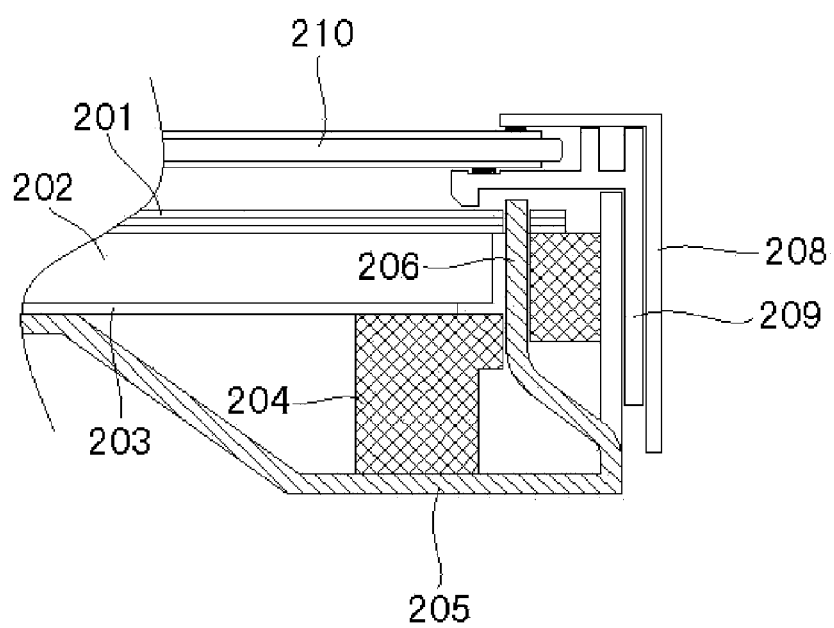
FIG. 4 is a schematic sectional view of the backlight module in FIG. 3.

The backlight module comprises a back cover 205, a positioning assembly and a backlight assembly. As shown in FIG. 2 through FIG. 4, the backlight assembly is connected with the back cover 205 by the positioning assembly. The positioning assembly comprises a positioning component 204 located at the corner of the back cover 205 and a bending portion 206 provided on the back cover 205. Although there is only a positioning component 204 shown in figures, there may be two or more positioning components 204 at the corners. The positioning component(s) 204 is used to connect the backlight assembly to the back cover 205.

It is should be noted that the positioning component 204 is adhered onto the back cover 205 by adhesive tapes. For example, the positioning component 204 is fixed to the bottom surface of the back cover 205 by double faced adhesive tapes. Compared with the traditional backlight module, the positioning component 204 has no hook and thus does not penetrate through the back cover 205. Therefore, the backlight module in the present invention is more beautiful and easier to assemble.

Figure 5:
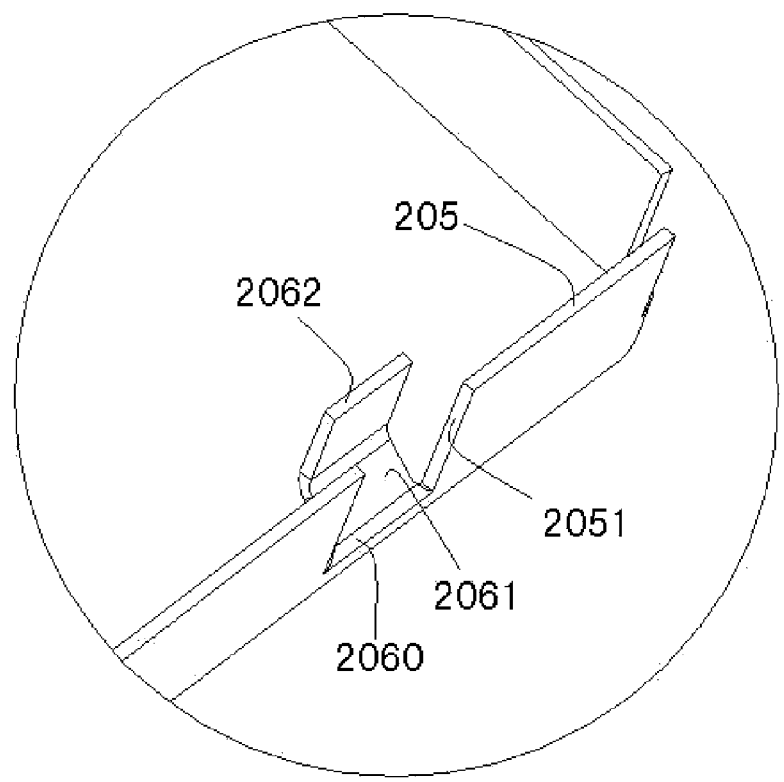
FIG. 5 is a schematic view of the bending portion of the backlight module in FIG. 3.

As shown in FIG. 5, the bending portion 206 is formed on the side wall 2051 of the back cover 205 in an integral manner and extends inwards. Since the bending portion 206 is formed on the side wall 2051 of the back cover 205 integrally, the mechanical strength of bending portion 206 is high. In particular, the bending portion 206 comprises a first bending section 2061 extending inwards and a second bending section 2062 extending upwards from the first bending section 2061. The bending portion 206 may be formed by punching the side wall 2051 of the back cover 205. As shown in FIG. 5, the bending portion 206 is joined with the back cover 205 at the joining portion 2060. The second bending section 2062 penetrates through the positioning component 204. The positioning component 204 is provided with a suspending hole, the second bending section 2062 is inserted into the second bending section 2062. In this way, the positioning component 204 is positioned by the bending portion 206.

As shown in FIG. 2 and FIG. 4, the backlight assembly comprises a reflecting sheet 203, a light guiding plate 202 and optical membranes 201, the reflecting sheet 203. The light guiding plate 202 and the optical membranes 201 are overlapped on the positioning component 204. The optical membranes 201 have three layers in this embodiment. The optical membranes 201 are above the light guiding plate 202 and the reflecting sheet 203. The light guiding plate 202 is above the reflecting sheet 203. The light guiding plate 202 is located between the optical membranes 201 and the reflecting sheet 203. The light guiding plate 202 and the reflecting sheet 203 is supported on the stepping portion of the positioning component 204. As described above, the second bending section 2062 penetrates through the positioning component 204. Moreover, the optical membranes 201 are provided with through holes 207, the second bending section 2062 penetrates through the through holes 207. In other words, the second bending section 2062 firstly penetrates through the positioning component 204, and then penetrates through the optical membranes 201 upwards. The free end of the second bending section 2062 is higher than the optical membranes 201 in the figure. The free end of the second bending section 2062 is higher than the light source (such as LED light bar). Also, the mechanical strength of bending portion 206 is high. There is no need to worry that the light guiding plate 202 expands and exerts pressure on other parts (such as the light source of the backlight module).

In this way, the light guiding plate 202 and the optical membranes 201 are positioned by the positioning component 204 and the bending portion 206. Also, the free end of the second bending section is higher than the optical membranes 201 and the light source (such as LED light bar) in vertical direction. The positioning component 204 and the optical membranes 201 can be fixed securely by the second bending section 2062 of the bending portion 206. Additionally, the mechanical strength of bending portion 206 is high. Accordingly, there is no need to worry that the light guiding plate 202 expands and exerts pressure on other parts (such as the light source of the backlight module).

Figure 1:
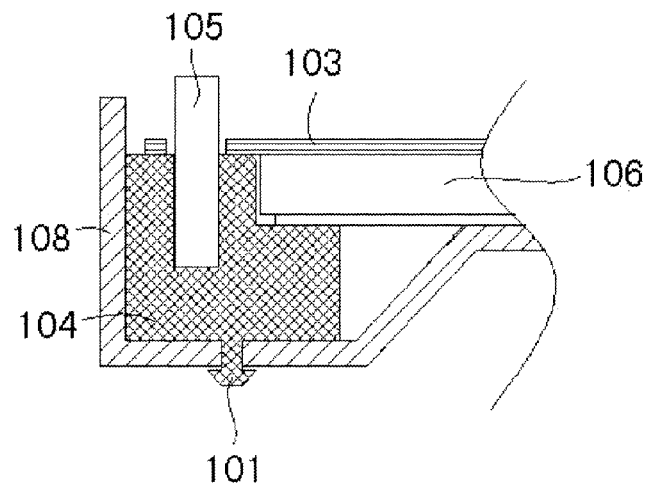
FIG. 1 is a schematic sectional view of traditional backlight module.
Figure 6:
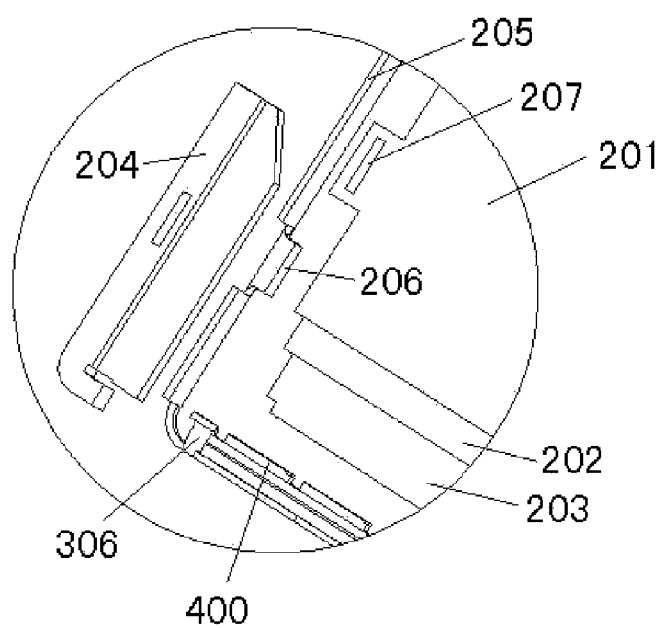
FIG. 6 is a schematic exploded view of the backlight module according to another embodiment of the present invention.
Figure 7:
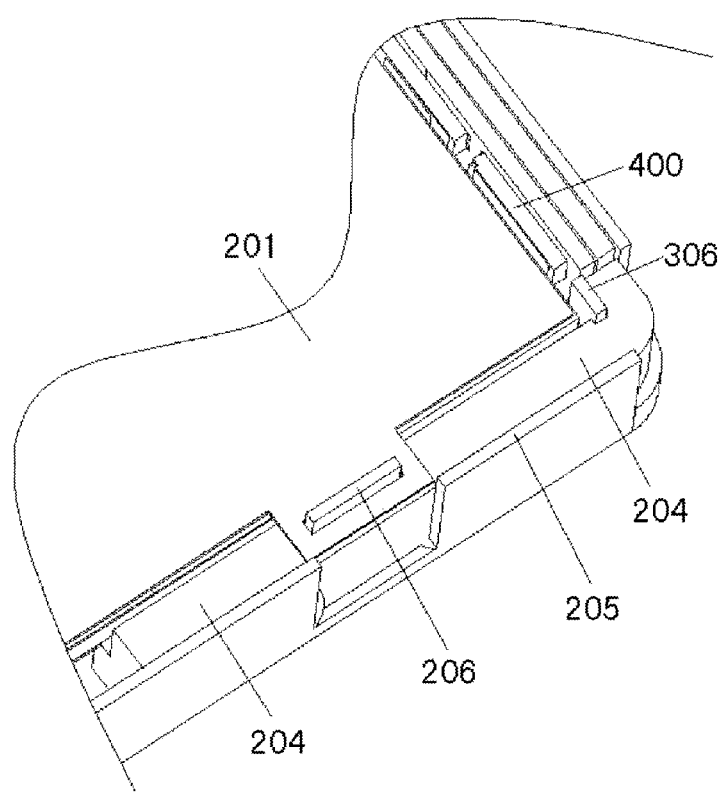
FIG. 7 is a schematic view of the backlight module of FIG. 6 in assembled state.

A modified embodiment will be described with reference to FIG. 6 and FIG. 7. The positioning assembly further comprises an additional bending portion 306 compared with the embodiment in FIG. 1. The additional bending portion 306 is formed on the side wall of the back cover 205 in an integral manner. The additional bending portion 306 also extends inwards and then upwards. The additional bending portion 306 is located at the same side with the light source 400 of the backlight module, so as to prevent the light source from being pressed by the expansion of light guide plate 400. In this embodiment, the light source 400 is a LED light bar. The additional bending portion 306 and the bending portion 206 are located at the different sides of the back cover 205 as shown in FIG. 6 and FIG. 7. The additional bending portion 306 and the bending portion 206 have the same shape. The additional bending portion 306 and the bending portion 206 can be formed in one punching at the same time.

Although only one additional bending portion 306 and only one bending portion 206 are shown in figures, there can be two or more additional bending portion and bending portion.

As shown in FIG. 7, the additional bending portion 306 is located at the inside of the positioning component 204. The additional bending portion 306 is located at the outside of the light guiding plate 202. In other words, the additional bending portion 306 is located between the positioning component 204 and the light guiding plate 202. In this way, the additional bending portion 306 can resist the expansion movement of the light guiding plate 202. Accordingly, there is no need to worry that the light guiding plate 202 expands and exerts pressure on the light source 400.

According to another aspect of the present invention, a LCD module is provided. The LCD module comprises the backlight module described above, a LCD panel 210 and a front frame 208. The backlight module is connected with the front frame 208. The backlight module comprises a back cover 205, a positioning assembly and a backlight assembly. As described above, the backlight assembly is connected with the back cover 205 by the positioning assembly. The positioning assembly comprises a positioning component 204 located at the corner of the back cover 205 and a bending portion 206 provided on the back cover 205, the positioning component 204 is adhered onto the back cover 205. The LCD module further comprises a plastic frame 209 between the backlight module and the front frame 208, the LCD panel 210 is received between the front frame 208 and the plastic frame 209.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the 3 particular embodiment disclosed, but that the present invention will include all embodiments falling within the scope of the appended claims.

What is claimed is:

1. A backlight module, comprising a back cover, a positioning assembly and a backlight assembly, wherein the backlight assembly is connected with the back cover by the positioning assembly, the positioning assembly comprises a positioning component located at the corner of the back cover and a bending portion provided on the back cover, the positioning component is adhered onto the back cover, wherein the bending portion is formed on the side wall of the back cover in an integral manner and extends inwards; wherein the bending portion comprises a first bending section extending inwards and a second bending section extending upwards from the first bending section, the second bending section penetrates through the positioning component.

2. The backlight module of claim 1, wherein the backlight assembly comprises a reflecting sheet, a light guiding plate and optical membranes, the reflecting sheet, the light guiding plate and the optical membranes are overlapped on the positioning component.

3. The backlight module of claim 2, wherein the optical membranes are provided with through holes, the second bending section penetrates through the through holes.

4. The backlight module of claim 1, wherein the positioning assembly further comprises an additional bending portion, the additional bending portion is formed on the side wall of the back cover in an integral manner, the additional bending portion extends inwards and then upwards, the additional bending portion is located at the same side with the light source of the backlight module.

5. The backlight module of claim 4, wherein the additional bending portion and the bending portion are located at the different sides of the back cover, the additional bending portion and the bending portion have the same shape.

6. A LCD module, comprising a backlight module, a LCD panel and a front frame, the backlight module is connected with the front frame, the backlight module comprises a back cover, a positioning assembly and a backlight assembly, wherein the backlight assembly is connected with the back cover by the positioning assembly, the positioning assembly comprises a positioning component located at the corner of the back cover and a bending portion provided on the back cover, the positioning component is adhered onto the back cover; wherein the LCD module further comprises a plastic frame between the backlight module and the front frame, the LCD panel is received between the front frame and the plastic frame; wherein the bending portion is formed on the side wall of the back cover in an integral manner and extends inwards; wherein the bending portion comprises a first bending section extending inwards and a second bending section extending upwards from the first bending section, the second bending section penetrates through the positioning component.

7. The LCD module of claim 6, wherein the backlight assembly comprises a reflecting sheet, a light guiding plate and optical membranes, the reflecting sheet, the light guiding plate and the optical membranes are overlapped on the positioning component.

8. The LCD module of claim 7, wherein the optical membranes are provided with through holes, the second bending section penetrates through the through holes.

9. The LCD module of claim 8, wherein the positioning assembly further comprises an additional bending portion, the additional bending portion is formed on the side wall of the back cover in an integral manner, the additional bending portion extends inwards and then upwards, the additional bending portion is located at the same side with the light source of the LCD module.

10. The LCD module of claim 9, wherein the additional bending portion and the bending portion are located at the different sides of the back cover, the additional bending portion and the bending portion have the same shape.

* * * * *